United States Patent
Walker

(10) Patent No.: US 11,351,905 B2
(45) Date of Patent: Jun. 7, 2022

(54) COLLAPSIBLE GATE FOR A TRANSPORT TRAILER

(71) Applicant: CEI Equipment Company, LLC, Cedar Rapids, IA (US)

(72) Inventor: Justin Walker, Cedar Rapids, IA (US)

(73) Assignee: CEI Equipment Company, LLC, Cedar Rapids, IA (US)

( * ) Notice: Subject to any disclaimer, the term of this patent is extended or adjusted under 35 U.S.C. 154(b) by 352 days.

(21) Appl. No.: 16/750,722

(22) Filed: Jan. 23, 2020

(65) Prior Publication Data

US 2020/0247299 A1 Aug. 6, 2020

Related U.S. Application Data

(60) Provisional application No. 62/799,260, filed on Jan. 31, 2019.

(51) Int. Cl.
*B60P 1/56* (2006.01)
*B60P 1/64* (2006.01)

(52) U.S. Cl.
CPC .............. *B60P 1/56* (2013.01); *B60P 1/6418* (2013.01)

(58) Field of Classification Search
CPC ........... B60P 1/56; B65D 90/54; B65D 90/58; B65D 90/582; B65D 90/587; B65D 90/62; B65D 90/623; B65D 90/626; B65D 90/64; B65D 90/66; A01D 90/10; E02F 3/6427
USPC ........ 298/27, 29, 31, 33, 34, 35 R, 36, 35 M
See application file for complete search history.

(56) References Cited

U.S. PATENT DOCUMENTS

| | | | | | |
|---|---|---|---|---|---|
| 4,104,979 A | * | 8/1978 | van der Werff | ....... | B63B 35/306 414/137.1 |
| 4,306,518 A | * | 12/1981 | Herring | ................ | A01K 5/0225 119/53.5 |
| 4,329,106 A | * | 5/1982 | Adler | ................... | B65D 90/623 414/388 |
| 4,491,087 A | * | 1/1985 | Herring, Sr. | ......... | A01K 5/0241 119/53.5 |
| 5,782,277 A | * | 7/1998 | Ung | ..................... | B65D 90/626 141/93 |
| 7,540,398 B2 | | 6/2009 | Medemblik | | |
| 2010/0270848 A1 | | 10/2010 | Heider et al. | | |

FOREIGN PATENT DOCUMENTS

| | | | | | |
|---|---|---|---|---|---|
| BE | 847956 A | * | 5/1977 | ........... | B63B 35/306 |
| DE | 2757608 A | * | 6/1979 | ........... | B65D 90/623 |
| EP | 1203734 A1 | * | 5/2002 | ........... | B65D 90/587 |
| FR | 490970 A | * | 5/1919 | | |
| FR | 2750965 A1 | * | 1/1998 | ................ | B60P 1/56 |

* cited by examiner

*Primary Examiner* — Hilary L Gutman
(74) *Attorney, Agent, or Firm* — Shuttleworth & Ingersoll, PLC; Jason Sytsma

(57) ABSTRACT

A gate assembly comprising of a track comprising a vertical portion and two angular portions on opposing sides of the hopper. A pair of rectangular gates each comprising a longitudinal edge and opposing lateral edges slidingly engaged on the track allows the gates to move between a lowered, closed position and a raised, open position. A hinge combines the longitudinal edge of each of the pair of rectangular gates and allows them to pivot toward and away from each other during closing and opening, respectively.

16 Claims, 4 Drawing Sheets

US 11,351,905 B2

COLLAPSIBLE GATE FOR A TRANSPORT TRAILER

CROSS-REFERENCE TO RELATED APPLICATIONS

The present application claims the benefit of U.S. Provisional Patent Application No. 62/799,260 filed Jan. 31, 2019, the contents of which is incorporated herein by reference.

BACKGROUND

A transport trailer is a trailer that includes one or more discharge hoppers below the trailer body. Each of the hoppers includes a discharge opening through which commodity may flow in order to empty the trailer. The discharge opening at the lower end of the hopper is typically provided with a door that can be selectively opened and closed by a user to permit flow through the discharge opening or to prevent flow through the discharge opening. In a conventional design, the door slides in a generally horizontal plane to open and close the discharge opening.

One disadvantage of the conventional sliding door design is that it is difficult to move the door when the trailer is fully loaded with a commodity or bulk materials. According to a conventional design a hand crank is provided to allow a user to move the sliding door back and forth between the open and closed positions. However, it can be difficult and inconvenient to manually provide the necessary force to move the sliding door.

What is needed is a powered door opening and closing mechanism that opens and closes a discharge opening located at the lower end of a hopper chute that accommodates variability in the commodity or other loose granular material with variation in flow characteristics.

SUMMARY

According to this disclosure, disclosed is a gate assembly for hopper in a hopper trailer. The hopper has a discharge hopper chute with a downwardly disposed opening for easy emptying of the hopper. The hopper chute is sealed by a gate assembly comprising of a track comprising a vertical portion and two angular portions on opposing sides of the hopper. A pair of rectangular gates each comprising a longitudinal edge and opposing lateral edges slidingly engaged on the track allows the gates to move between a lowered, closed position and a raised, open position. A hinge combines the longitudinal edge of each of the pair of rectangular gates and allows them to pivot toward and away from each other during closing and opening, respectively.

In one implementation, the vertical portion of the track comprises of a vertical linear guide rod on opposing sides of the hopper. The two angular portions of the track comprise two angular guide rods on each opposing side of the hopper. These can be positioned in an inverted y-shape. The vertical guide rod and the two angular guide rods on each opposing side of the hopper can comprise a rounded bearing surface. In such an implementation, the track assembly can comprise a first slide on each side of the track that combines a hinge for the rectangular gates to the rounded bearing surface of one of the two angular guide rods and a second slide can be combined to each one of the pair of rectangular gates and to a corresponding one of the rounded bearing surface of the vertical guide rod on each opposing side of the hopper.

In another implementation, an actuator can be combined to the pair of rectangular gates for moving the pair of rectangular gates between the lowered, closed position and the raised, open position. A cross-bar can extend between sides of the hopper and a hanger can be provided supporting pair of rectangular gates or to support the actuator above the rectangular gates to raise and lower them without obstructing the material inside the hopper.

DETAILED DESCRIPTION AND BEST MODE OF IMPLEMENTATION

Figure 1:
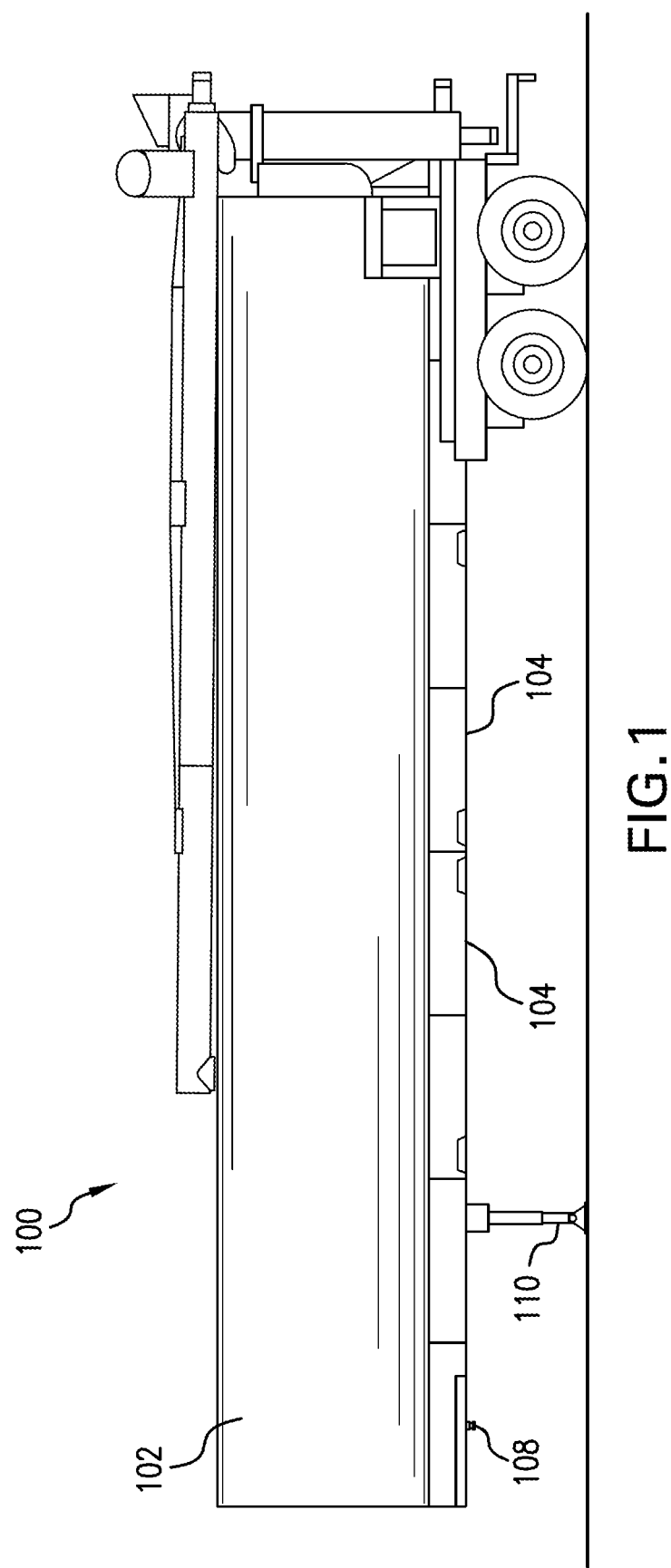
FIG. 1 is a side elevation view of a transport trailer that includes a hopper door opening and closing apparatus according to one embodiment of the present invention.

FIG. 1 shows a transport trailer 100 according to one embodiment of the present invention. The transport trailer 100 includes a storage compartment 102 that can be divided into one or more hoppers 103 (shown in FIG. 2) that are suited for containing grain, coal, fertilizer, gravel, sand, or other loose solid flowable material. The lower portion of hopper 103 tapers downward and terminates at its lower portion with a hopper chute 104. The transport trailer 100 of FIG. 1 includes a kingpin structure 108 that is adapted to be connected to the fifth wheel of a truck (not shown) or other towing vehicle. Collapsible and foldable jacks 110 are provided to support the transport trailer 100 when it is not connected to a towing vehicle.

Figure 2:
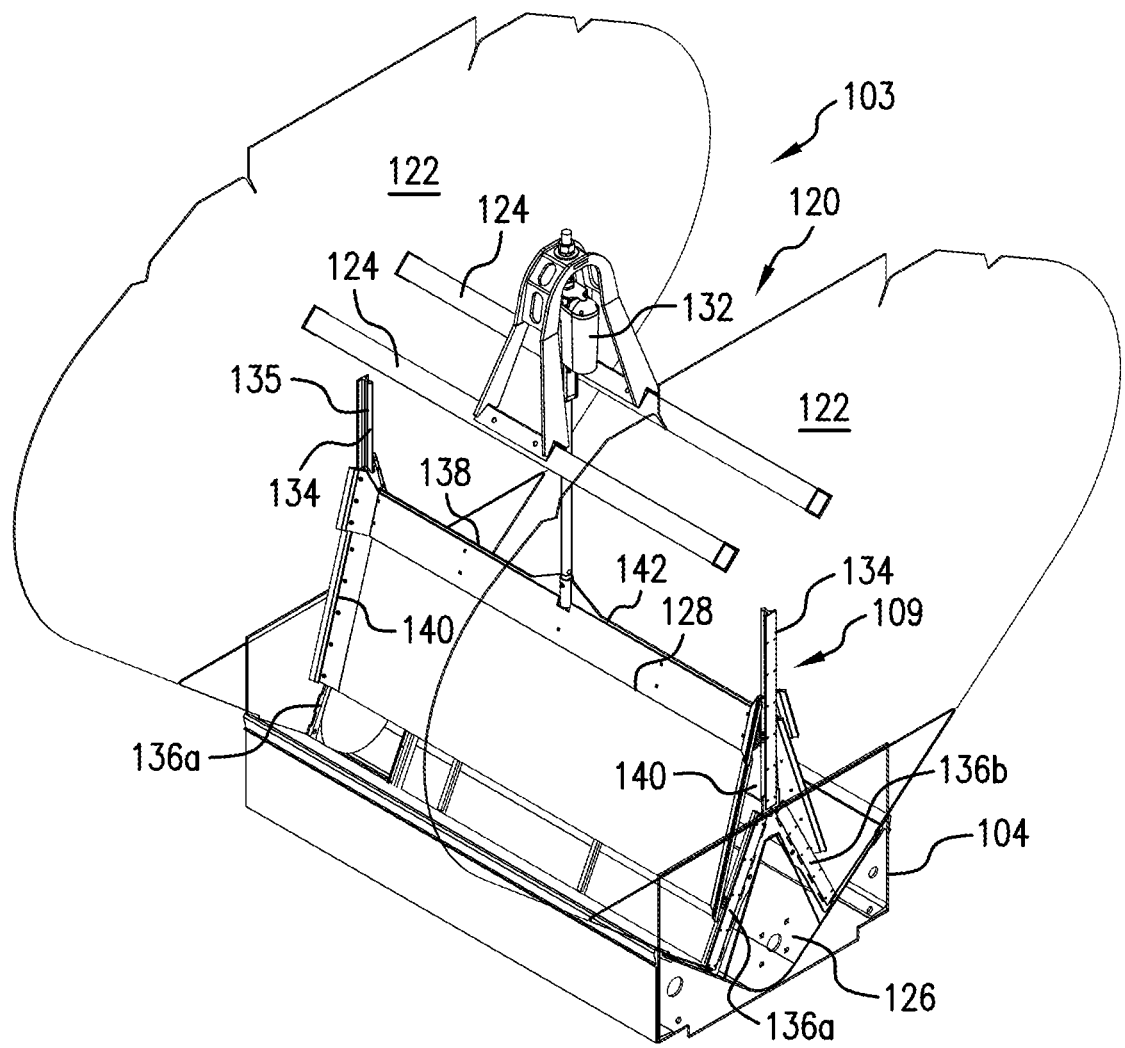
FIG. 2 shows a gate assembly for the hopper of the transport trailer shown in FIG. 1 in the raised (open) position.
Figure 3:
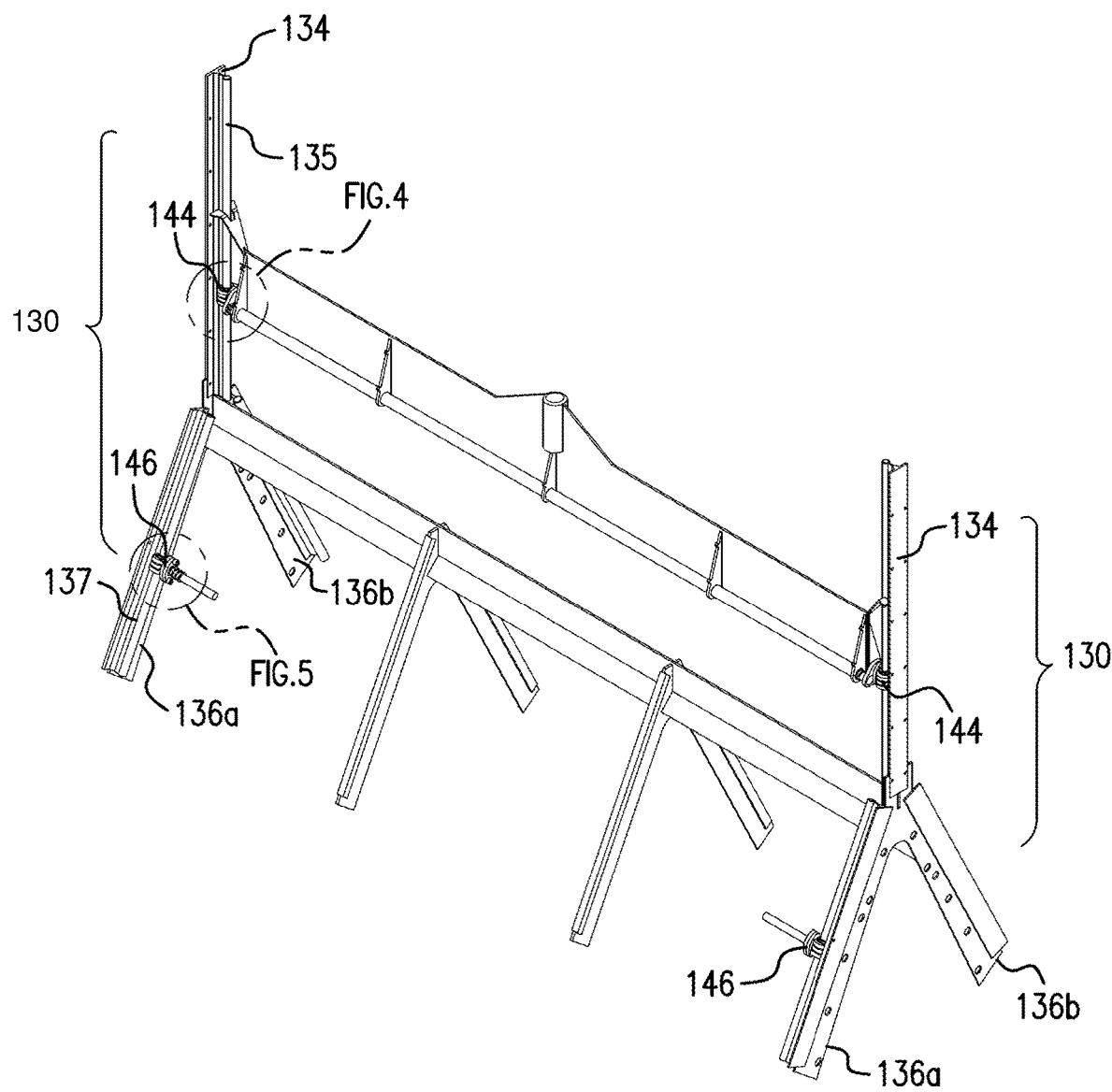
FIG. 3 shows the gate assembly of FIG. 2 with the rectangular gates removed.

FIG. 2 shows a hopper 103 in the inside of storage compartment 102. Storage compartment 102 has multiple contiguous hoppers 103 each outfitted with a gate assembly 120 for opening and closing hopper chute 104. Each hopper 103 comprises of two opposing side bulkheads 122, at least one cross-bar 124 extending between the two opposing side bulkheads 122, and a trough 126 extending between the two opposing sides beneath cross-bar 124. An auger or other transport mechanism (not shown) may be positioned in trough 126 to transport the load from the compartment when gate assembly 120 is opened.

Gate assembly 120 comprises of a pair of rectangular gates 128 hinged together at the top and positioned to ride along a track 130. An actuator 132 positioned above track 130 moves rectangular gates 128 between a lowered, closed position and a raised, open position along track 130. As rectangular gates 128 are opened, material in hopper 103 is free to flow out discharge opening at the lower extreme of the hopper chute 104. Actuator 132 provides precise control of the flow of material out hopper chute 104 that can be adjusted based on the characteristics of the material.

More specifically, track 130 of gate assembly 120 comprises a vertical portion 134 and two angular portions 136a, 136b on opposing sides of the hopper. In one implementation, vertical portion 134 comprises of a vertical guide rod 135 on opposing sides of hopper 103. Two angular portions 136a, 136b comprise two angular guide rods 137 on each opposing side of hopper 103. Vertical guide rod 135 and the two angular guide rods 137 on each opposing side of hopper 103 can comprise a rounded bearing surface. In this implementation, track 130 can have an inverted y-shape.

Rectangular gates 128 are configured to ride on track 130. Each of rectangular gates 128 can comprise a longitudinal edge 138 and opposing lateral edges 140 slidingly engaged on track 130 for moving rectangular gates 128 between a lowered, closed position and a raised, open position. A hinge 142 combines longitudinal edge 138 of each of the pair of rectangular gates 128 together so that the respective rectangular gates 128 can pivot towards and away from each other as they ride along track 130.

Figure 4:
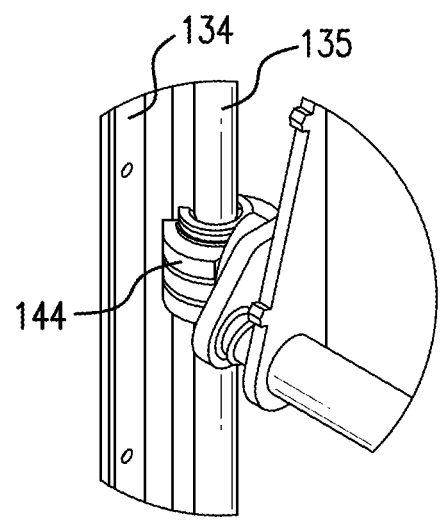
FIG. 4 shows a close up view of the first slide for attaching the hinge of the rectangular gates to the track.
Figure 5:
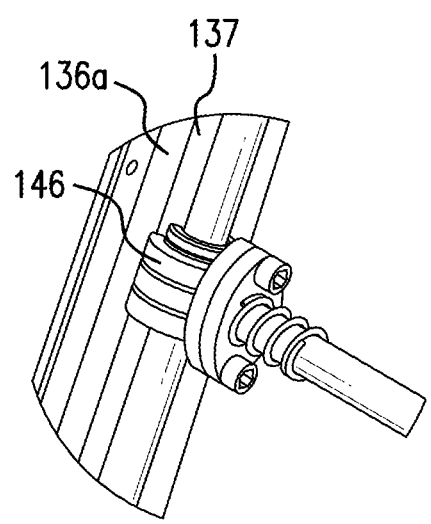
FIG. 5 shows a close up view of the second slide for attaching the rectangular gates to the track.

A first slide 144 (shown in detail in FIG. 4) combines hinge 142 of rectangular gates 128 to the rounded bearing surface of vertical guide rod 135. A second slide 146 combines one of the two rectangular gates 128 to the rounded bearing surface of angular guide rod 137. First slide 144 and the second slide 146 on each of the two rectangular gates 128 sliding on the respective bearing surfaces provides a smooth moving surface for rectangular gates 128.

Rectangular gates 128 are raised and lowered by an actuator 132 suspended above track 130. A hanger 148 attached to the two cross-bars 124 suspends actuator 132 above track 130. The other end of actuator 132 is combined to hinge 142, which combines rectangular gates 128. Actuator 132 can be any type of electric, pneumatic, or hydraulic actuator. In one embodiment, actuator 132 can be removed and replaced with a manual crank shaft for manually raising and lowering rectangular gates 128.

Gate assembly 120 accommodates most material flow characteristics by not obstructing the flow path of the material out of hopper 103. Gate assembly 120 also agitates the material in hopper 103 as the gate cycles from the lowered position to the raised position.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

We claim:

1. A gate assembly for a storage compartment of a hopper trailer comprising:
   a hopper with a discharge hopper chute with a downwardly disposed opening;
   a track comprising a vertical portion and two angular portions on opposing sides of the hopper; and
   a pair of rectangular gates each comprising a longitudinal edge and opposing lateral edges slidingly engaged on the track for moving between a lowered, closed position and a raised, open position.

2. The gate assembly of claim 1, further comprising a cross-bar extending between sides of the hopper and a hanger combined to the hopper for supporting the pair of rectangular gates.

3. The gate assembly of claim 1, wherein the vertical portion of the track comprises of a vertical linear guide rod on opposing sides of the hopper and wherein the two angular portions of the track comprise two angular guide rods on each opposing side of the hopper.

4. The gate assembly of claim 3, wherein the track has an inverted y-shape.

5. The gate assembly of claim 3, wherein the vertical guide rod and the two angular guide rods on each opposing side of the hopper further comprise a rounded bearing surface.

6. The gate assembly of claim 5, further comprising a first slide on each side of the track that combines a hinge for the rectangular gates to the rounded bearing surface of one of the two angular guide rods.

7. The gate assembly of claim 5, further comprising a second slide combined to each one of the pair of rectangular gates and to a corresponding one of the rounded bearing surface of the vertical guide rod on each opposing side of the hopper.

8. The gate assembly of claim 1, further comprising an actuator combined to the pair of rectangular gates for moving the pair of rectangular gates between the lowered, closed position and the raised, open position.

9. A gate assembly for a storage compartment of a hopper trailer comprising:
   a hopper with a discharge hopper chute with a downwardly disposed opening;
   a track comprising a vertical portion and two angular portions on opposing sides of the hopper;
   a pair of rectangular gates each comprising a longitudinal edge and opposing lateral edges; and
   a hinge combining the longitudinal edge of each of the pair of rectangular gates, wherein the pair of rectangular gates are slidingly engaged on the track for moving between a lowered, closed position and a raised, open position.

10. The gate assembly of claim 9, further comprising a cross-bar extending between sides of the hopper and a hanger combined to the hopper for supporting pair of rectangular gates.

11. The gate assembly of claim 9, wherein the vertical portion of the track comprises of a vertical linear guide rod on opposing sides of the hopper and wherein the two angular portions of the track comprise two angular guide rods on each opposing side of the hopper.

12. The gate assembly of claim 11, wherein the track has an inverted y-shape.

13. The gate assembly of claim 11, wherein the vertical guide rod and the two angular guide rods on each opposing side of the hopper further comprise a rounded bearing surface.

14. The gate assembly of claim 13, further comprising a first slide on each side of the track that combines a hinge for the rectangular gates to the rounded bearing surface of one of the two angular guide rods.

15. The gate assembly of claim 14, further comprising a second slide combined to each one of the pair of rectangular gates and to a corresponding one of the rounded bearing surface of the vertical guide rod on each opposing side of the hopper.

16. The gate assembly of claim 9, further comprising an actuator combined to the pair of rectangular gates for moving the pair of rectangular gates between the lowered, closed position and the raised, open position.

* * * * *